Patented Oct. 17, 1939

2,176,427

UNITED STATES PATENT OFFICE 2,176,427

ELECTRIC STORAGE BATTERY RETAINER

William Ernest Kershaw, Gwynedd Valley, Pa., assignor to The Electric Storage Battery Company, Philadelphia, Pa., a corporation of New Jersey No Drawing. Application July 6, 1935, Serial No. 30,171

5 Claims. (Cl. 136—146)

In the operation of storage batteries of the lead-acid type, it is well known that the lead peroxide, constituting the active material of positive plates, during the operation of the battery, gradually softens and tends to disintegrate and eventually fall away from the plates to the bottom of the cell, where it becomes inactive. This effect very largely limits the useful life of the positive plates and, in order to diminish the effect and increase the life, various types of retainers have been employed in the form of flat perforated or porous sheets of inert material overlying the surfaces of the electrodes; or the retainer is sometimes in the form of a perforated tube completely encasing the active material in the form of pencils provided with axial conducting cores. In either case, the retainer is held in close contact with the lead peroxide constituting the active material of the positive plate in such a manner as to permit access of the electrolyte to the active material through pores, or slots, while at the same time furnishing a support for the active material and thus retarding its falling away to the bottom of the cell.

The material of which these retainers are made has to meet certain physical requirements: that is to say, it requires a considerable tensile strength, toughness and elasticity within the temperature range encountered, as well as facility of fabrication, and, above all, it should be absolutely resistant to the chemical action to which it is exposed. The material which has heretofore most nearly met these requirements is hard rubber, but this material failed in certain important respects both chemical and physical.

With regard to its chemical properties, hard rubber is not entirely satisfactory, for while it is resistant to attack by dilute sulphuric acid and is also resistant to ordinary oxidation by exposure to the air, yet when subjected to the peculiarly intense oxidizing conditions which exist in a storage battery cell caused by contact with lead peroxide and aggravated by electrolytic action, oxidation takes place to a very marked degree with the result that the rubber is gradually decomposed on the inner surface, thus becoming progressively thinner until eventually it wears away to nothing. Moreover, this disintegration takes place not only upon the inner surface but upon the exposed surfaces of the openings, wherever peroxide may lodge in contact with the rubber surface. In the case of slotted tubular retainers, therefore, not only does the inside diameter of the tube increase, thus permitting the peroxide to soften, but the openings of the slots, or holes, also increase, thus facilitating the tendency of erosion and consequent loss of active material.

In respect to physical properties, hard rubber, when deformed by bending or stretching, takes a permanent set, even at normal temperatures, and loses its elastic force tending to restore its original shape. This is particularly objectionable in the tubular form of retainer, where the expansion and contraction of the active material during cycles of charge and discharge requires permanency of elastic force in the retainer in order to maintain the necessary pressure and keep the active material in compact condition and in good electrical contact throughout its mass and with the conducting core, notwithstanding these changes in volume.

I have discovered that a certain class of substances consisting of solid unvulcanized polymerization products of unsaturated organic compounds possess the property of absolutely resisting oxidation when subjected to the action of lead peroxide in the presence of electrolytic action. As examples of these substances may be mentioned "Vinylite", polymerized Styrol. Their inertness has been demonstrated by intensified oxidation tests carried out under my direction wherein hard rubber, "Vinylite" and polystyrol were subjected under identical conditions to intense oxidizing action in contact with lead peroxide in the presence of sulphuric acid and of continuous electrolytic action. The hard rubber tubes lost nearly half of their original weight and thickness whereas no loss whatever, or even etching of the surface, was observed in the case of the "Vinylite" and Styrol. Vinylite is a solid, thermoplastic, saturated synthetic resin resulting from the polymerization of a compound of the vinyl group, $CH_2=CH-$.

I have also discovered that these products besides possessing to a marked degree those necessary physical properties cited above, as exhibited by hard rubber, also possess the property, lacking in hard rubber, of retaining their elastic force under strain, thus producing highly important novel and useful results especially when employed in the tubular form of retainer.

These products after polymerization have an essentially saturated molecular structure, and are thermo-plastic, that is, they will soften under heat without undergoing chemical change, an important feature, permitting them to be molded at elevated temperature without loss of the desirable properties mentioned above.

As a result of this peculiar combination of physical and chemical properties, the substitution of these products for rubber material in retainers for storage batteries, in any of the usual forms and especially in the tubular form, constitutes such an improvement as may be said to improve the whole character of the battery, including marked extension of life, due to the fact that these retainers permanently maintain their function of holding the active material in place. These materials may be identified as products obtained by the polymerization of certain unsaturated organic compounds, the polymerization being carried to a point where the material has passed beyond the gummy or plastic state to the solid state (i. e. solid at normal temperature), without the aid of vulcanization. The term "vulcanization" is understood to refer to the chemical process as practiced in the rubber art.

These materials include polymerization products obtained from compounds containing an ethylene linkage, such as vinyl chloride ($CH_2$:$CHCl$) or the corresponding bromide, vinyl esters and other vinyl derivatives such as styrene or styrol ($CH_2$:$CH.C_6H_5$); compounds containing the acetylene linkage, such as acetylene (CH:CH)

or propine ($CH_3.C$:$CH$)

and compounds of the cumar type such as coumarone

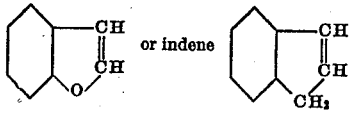

or indene

In carrying out my invention I may use one or a mixture of two or more of such compounds, with or without a filler, and with or without a plasticizer.

Such materials may be utilized in the form of perforated or porous sheets or tubes applied as retainers in contact with the surface of the active material of the positive plate, or by dissolving in a suitable solvent with or without a plasticizer, may be applied as a lacquer to the surface of a retainer of hard rubber or similar oxidizable material.

It will be obvious to those skilled in the art, to which the invention relates, that modifications may be made in details of construction and arrangement and in matters of mere form without departing from the spirit of the invention which is not limited to such matters or otherwise than as the prior art and the appended claims may require.

I claim:

1. A perforated storage battery retainer of which the thickness and perforation dimensions remain constant and which is made of vinyl resin which in contact with lead peroxide resists disintegration under the electrolytic action to which it is exposed in a storage battery.

2. A tubular storage battery retainer having perforations therein, and an internal diameter of constant dimensions and made of vinyl resin which in contact with lead peroxide and under the electrolytic action of a storage battery resists disintegrating action and consequent deformation.

3. A storage battery retainer substantially as described in claim 1 and in which the perforations are of the form of slots.

4. A storage battery retainer substantially as in claim 2 and in which the perforations are of the form of slots.

5. For retaining the active material of storage battery plates in desired position, a perforated retainer in contact with the lead peroxide of the positive plate and composed of a vinyl resin which retains its elastic force under strain and which substantially absolutely resists oxidation when subjected to the action of lead peroxide in the presence of electrolytic action.

WILLIAM ERNEST KERSHAW.